US006972941B2

(12) United States Patent
Miettinen et al.

(10) Patent No.: US 6,972,941 B2
(45) Date of Patent: Dec. 6, 2005

(54) FIXING AND PROTECTING ARRANGEMENT FOR A CAPACITOR

(75) Inventors: Osmo Miettinen, Vaasa (FI); Juha Norrena, Vaasa (FI); Timo Koskinen, Vaasa (FI); Leo Palomäki, Vaasa (FI)

(73) Assignee: Vacon Oyj, Vaasa (FI)

( * ) Notice: Subject to any disclaimer, the term of this patent is extended or adjusted under 35 U.S.C. 154(b) by 0 days.

(21) Appl. No.: 10/856,956

(22) Filed: Jun. 1, 2004

(65) Prior Publication Data

US 2005/0007725 A1 Jan. 13, 2005

(30) Foreign Application Priority Data

Jun. 4, 2003 (FI) ................................ 20030839

(51) Int. Cl.[7] ................................ H01G 2/08

(52) U.S. Cl. ................................ 361/274.3; 361/274.1

(58) Field of Search ................................ 361/32, 541, 522, 361/272, 274.1, 274.2, 274.3, 321.6

(56) References Cited

U.S. PATENT DOCUMENTS

| | | | | | |
|---|---|---|---|---|---|
| 2,140,039 | A | * | 12/1938 | Weiss | 361/274.1 |
| 3,656,035 | A | * | 4/1972 | Corman et al. | 361/274.3 |
| 4,309,739 | A | * | 1/1982 | Schmidt | 361/274.3 |
| 6,166,937 | A | | 12/2000 | Yamamura et al. | |
| 6,708,757 | B2 | * | 3/2004 | Hebel et al. | 165/80.3 |
| 2003/0047302 | A1 | | 3/2003 | Hebel et al. | |

FOREIGN PATENT DOCUMENTS

DE 10153513 11/2002

* cited by examiner

*Primary Examiner*—Eric W. Thomas
(74) *Attorney, Agent, or Firm*—Oliff & Berridge, PLC

(57) ABSTRACT

The present invention relates to a fixing and protecting arrangement for a capacitor. The arrangement comprises a cooling element, one or more recesses arranged in the cooling element, and a capacitor intended to be fixed into each recess. The arrangement is characterized in that it comprises one or more recesses arranged in the cooling element, in which recess the capacitor is intended to be arranged in such a way that the lower surface of the capacitor is in contact with the cooling element for transferring heat from the capacitor to the cooling element.

10 Claims, 5 Drawing Sheets

FIXING AND PROTECTING ARRANGEMENT FOR A CAPACITOR

FIELD OF THE INVENTION

The invention relates to a fixing and protecting arrangement for a capacitor.

BACKGROUND OF THE INVENTION

A fixing and protecting arrangement according to the invention can be used in an electrotechnical device, for example for fixing capacitors positioned in a frequency converter to fixing parts of the device and for protecting them against heating.

It is known from the prior art to fix the capacitors of a device to a fixing plate by using different fixing means, such as clips, bands or screws. One known way of fixing comprises a bolt fixed to a capacitor, which bolt is usually at the opposite end to its terminals end and by which bolt the capacitor is fixed to the fixing plate below it with a nut.

Such fixing solutions according to the prior art are, however, problematic, because there must always be a fixing means of a precisely suitable size available, and for screw-mounting, there must be a screw fixed or fixable to a capacitor. Further, such fixing is time-consuming with respect to the fixing technique. Further still, the fixing solutions according to the prior art do not give the capacitor any particular protection against heating.

BRIEF DESCRIPTION OF THE INVENTION

An object of the present invention is to eliminate drawbacks of the prior art and to provide a new kind of solution for fixing a capacitor to an electrotechnical device, which solution further offers the capacitor effective protection against heating.

This is achieved in such a way that the fixing and protecting arrangement for the capacitor has the characterizing features defined in accordance with the invention. More precisely, the arrangement according to the invention is mainly characterized by what is disclosed in the characterizing part of claim 1.

Preferred embodiments of the invention are described in the dependent claims.

A basic idea of the invention is that the capacitor is arranged in a recess provided in a cooling element, whereby the heating of the capacitor can be guided through the bottom of the capacitor to the cooling element.

Thus, the cooling element of controllable electrical drive, such as a frequency converter, functions preferably at the same time as a support means for the capacitor fixing; in other words, when mounted in place, the capacitor of the cooling element stays still at its mounting location. Secondly, sufficiently efficient cooling of the capacitor can be implemented through the bottom of the capacitor.

In addition to fixing, it is preferable to protect the capacitor with a protective covering manufactured of electrically isolating gastight and waterproof material, such as plastic or a corresponding polymer, whereby the fixing and protecting means according to the invention preferably forms an electrical insulator as well as a gastight and waterproof insulator around the capacitor. Further, the purpose of the protective covering is to prevent the spreading of capacitor pieces and generation of an arc inside the covering of the electrical device if the capacitor for some reason exploded to pieces due to an electrical interference impulse. When a protective covering is used, the surface between the capacitor and the cooling element must be arranged in such a way that sufficient heat transfer can be implemented.

The bottom of the capacitor can be arranged to be open. An electrically insulating film having good thermal conductivity, such as a Mylar® polyester film or an insulating film having corresponding properties, can be placed between the capacitor and the cooling element. If needed, also heat-conductive paste may be used.

Further, the capacitor may be fixed to the cooling element with an adapter collar that is positioned between the capacitor and the cooling element. Such an adapter collar can be manufactured simply and inexpensively, for instance by extruding it from a plastic appropriate for the purpose.

When an adapter collar is used, the cooling element may be provided with a deeper recess part in the portion of the adapter collar by milling, for example. The recess of the adapter collar can be arranged in such a way that the lower surface of the capacitor is in contact with the cooling element even if the adapter collar is mounted in place.

The adapter collar may be provided with a protruding portion, whose lower part is positioned in the recess of the cooling element and whose upper part having a greater outer diameter is positioned above the side surface of the cooling element.

By using an adapter collar and an insulating film, the drift distance between the capacitor and the cooling element can be made sufficiently long. The drift distance may be further increased by reducing the inner periphery diameter of the lower portion of the adapter collar, whereby the length of the drift distance relative to the lower surface of the capacitor and the cooling element increases. The adapter collar is arranged to form a tight and clean contact between the lower surface of the capacitor and the cooling element in such a way that the drift distance is not affected by detrimental dust or moisture. A tight adapter collar also prevents heat-conductive paste from drying if such is used for conducting heat.

One or more capacitors may be pressed fixedly against the cooling element with a fixing plate. Such a fixing plate is placed on the upper surface of the capacitor, from where it can be attached to the cooling element with separate joints. The fixing plate may be provided with holes, through which the capacitor is connectable.

The diameter of the recess portion arranged in the cooling element is preferably dimensioned in such a way that the capacitor becomes tightly positioned against the surface of the cooling element when fitted to the adapter collar. Significant advantages are achieved with this tight arrangement in the mounting and cooling of the capacitor, because the capacitor needs not be unduly pressed against the cooling element, and a tight contact is provided between the capacitor bottom and the cooling element, whereby no heat-insulating air gap remains between them, but the heat can be efficiently transferred to the cooling element.

Using a fixing and protecting arrangement according to the invention allows the working steps of the capacitor mounting to be reduced, which results in quicker and less expensive mounting of higher quality as well as in an end product, such as a frequency converter, of higher quality.

BRIEF DESCRIPTION OF THE FIGURES

The invention will now be explained in more detail with reference to the attached drawings, of which

DETAILED DESCRIPTION OF THE INVENTION

Referring to FIGS. 1 to 5, an example of the structure and operation of a typical fixing and protecting arrangement for a capacitor is explained.

Figure 1:
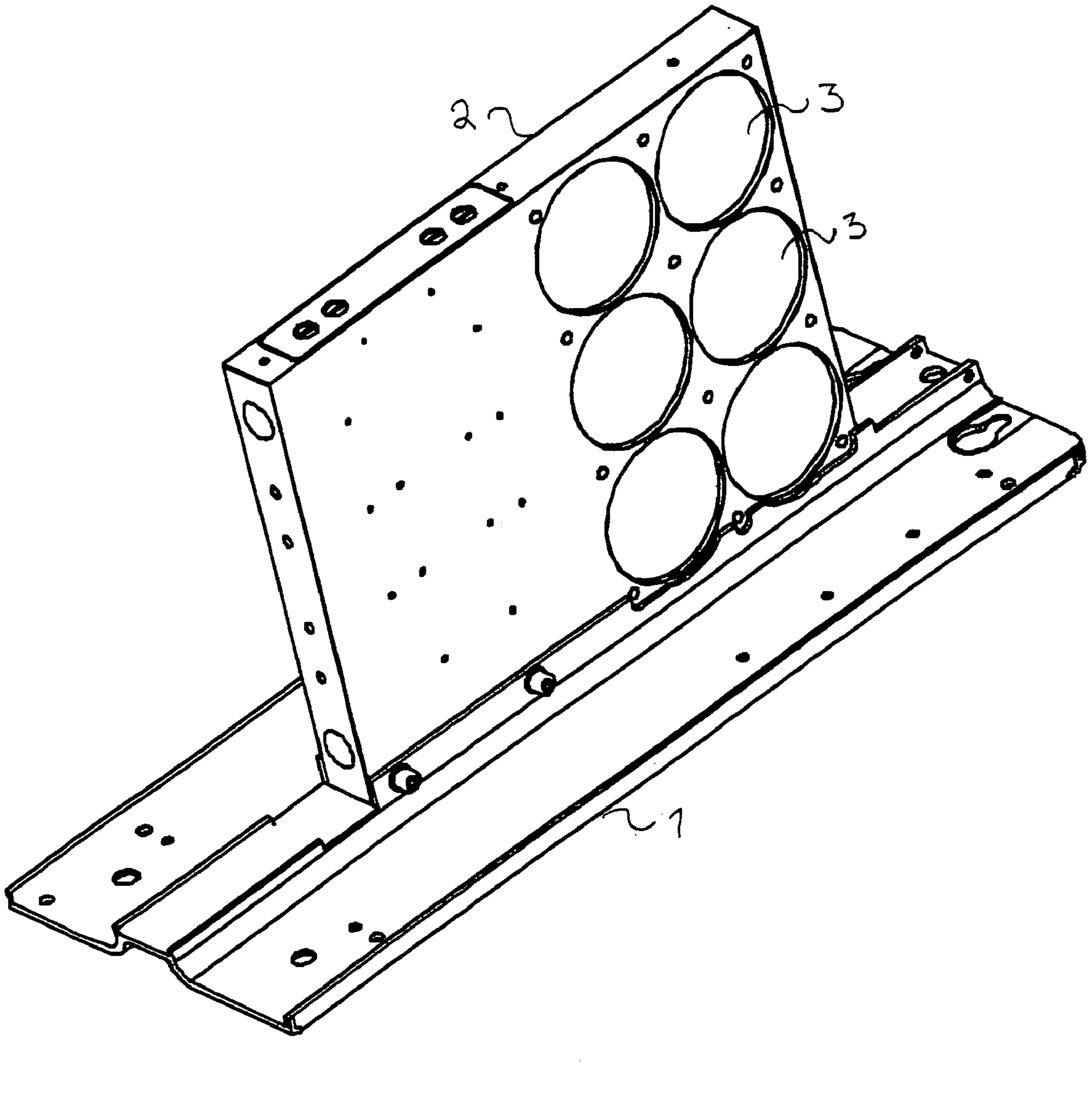
FIG. 1 shows an oblique top view of the support base of a fixing and protecting arrangement for a capacitor according to the invention.
Figure 2:
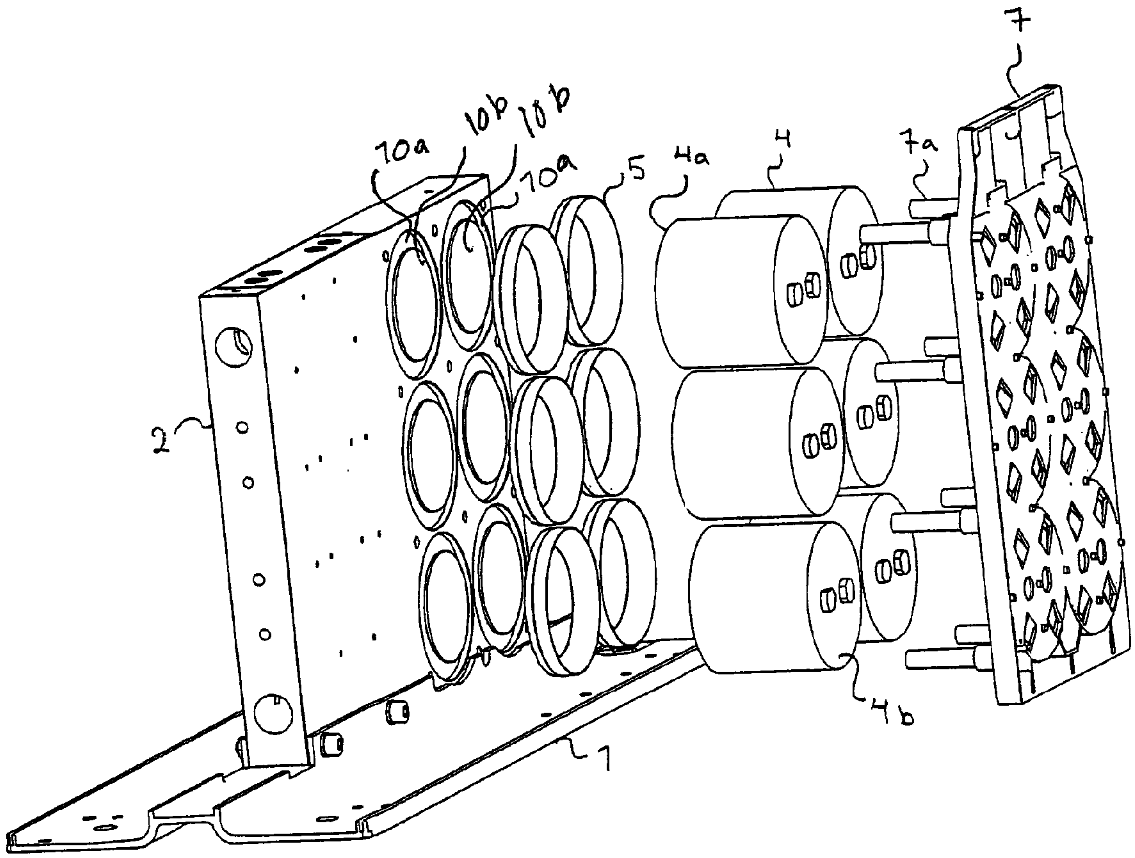
FIG. 2 shows an oblique front view of a detail according to the invention of a preferred embodiment of the fixing and protecting arrangement for the capacitor.

In accordance with FIGS. 1 and 2, the fixing and protecting arrangement for a capacitor comprises a support base 1. The support base 1 is provided with a cooling element 2, which functions in this embodiment also as the frame of the whole device. Thus, the cooling element 2 enables a firm fixing base for capacitors of the type shown in FIG. 2.

The cooling element 2 is, in accordance with FIG. 1 or 2, provided with recesses 3, 10*a* and 10*b* for fixing capacitors 4, there being one or more recesses, depending on the number of capacitors 4. The capacitors 4 are intended to be fixed into the recesses 3, 10*a* and 10*b*.

FIG. 1 shows an embodiment of a fixing and protecting arrangement for a capacitor. In this embodiment, the structure of the recess 3 is cylinder-like and the receiving surface of the recess 3 and the lower surface 4*a* of the capacitor 4 are at the same level.

FIG. 2 shows another embodiment of a fixing and protecting arrangement for a capacitor. In this embodiment, the recess 3 is, with respect to its depth, in two different planes 10*a*, 10*b*. The recess part closer to the outer periphery is the receiving deeper portion 10*a* of the adapter collar shown in FIG. 3. The depth of the deeper portion 10*a* is determined by the thickness of the lower portion 5*a* of the adapter collar in such a way that the lower surface 4*a* of the capacitor is in contact with the inner recess 10*b* arranged in the cooling element 2, although the adapter collar 5 is mounted between them. This open interior opening of the adapter collar 5 allows heat to transfer from the capacitor 4 to the surface of the inner recess 10*b* of the cooling element 2. The capacitor heats up mostly in the central part of the bottom, which must be taken into consideration when the inner periphery diameter of the lower portion 5*a* of the adapter collar is dimensioned.

Figure 3:
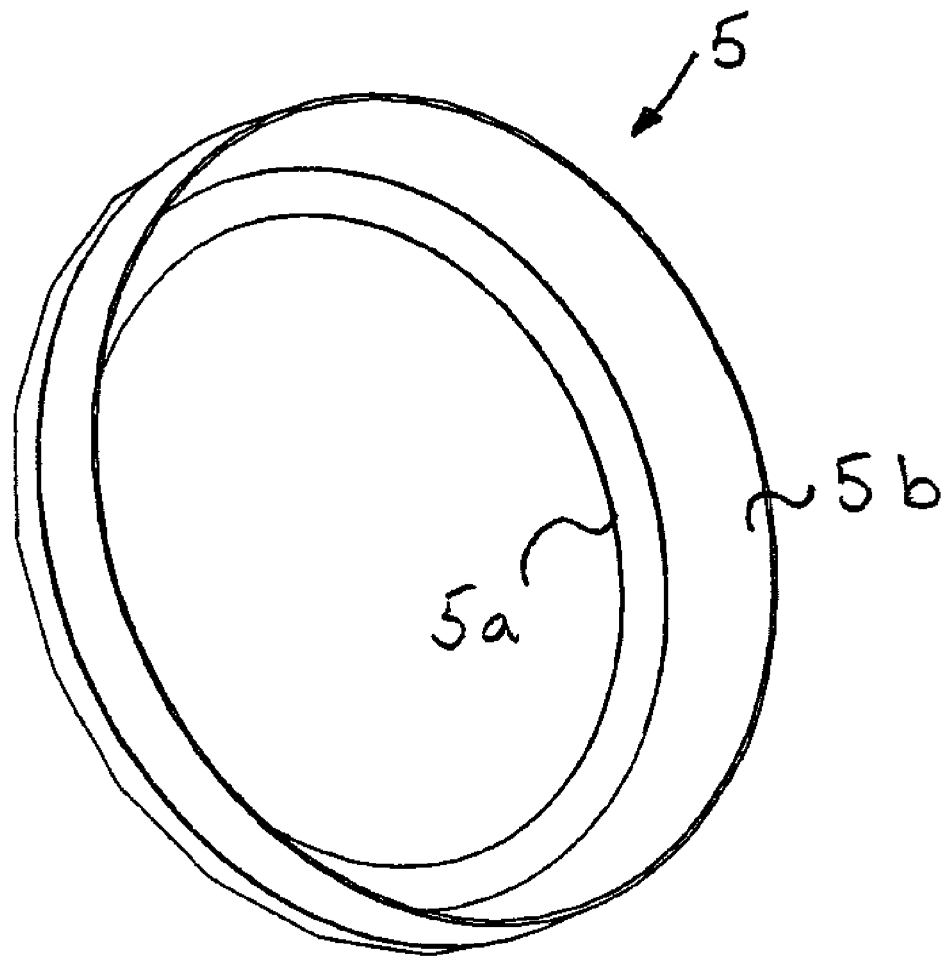
FIG. 3 shows a detail of the adapter collar of the embodiment shown in FIG. 2.

The outer periphery diameter of the upper portion 5*b* of the adapter collar 5 shown in FIG. 3 is greater than the diameter of the recess arranged in the cooling element, whereby the adapter collar 5 partially protrudes from the surface of the cooling element 2, giving additional support for the fixing of the capacitor 4.

Figure 4:
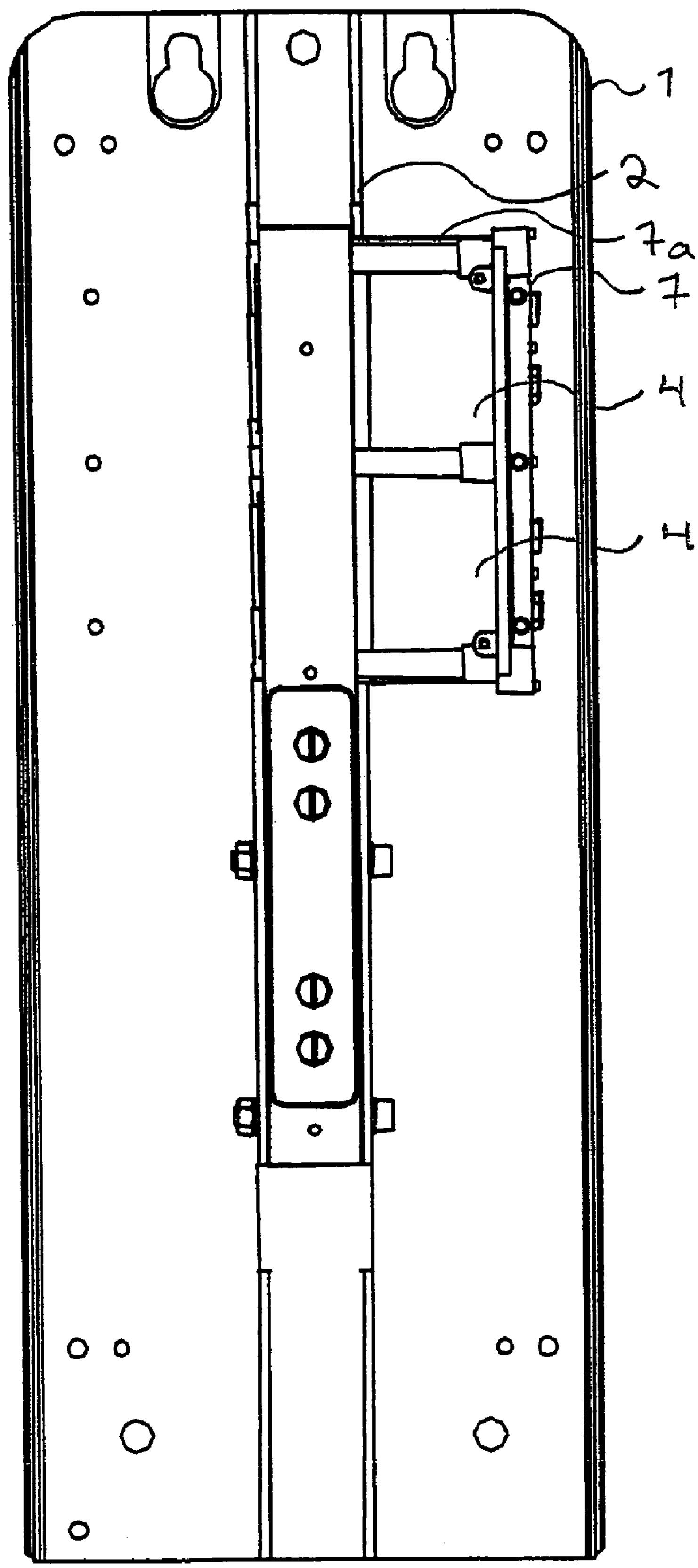
FIG. 4 shows a direct top view of the capacitor fixing and protecting arrangement of FIG. 2 when assembled.
Figure 5:
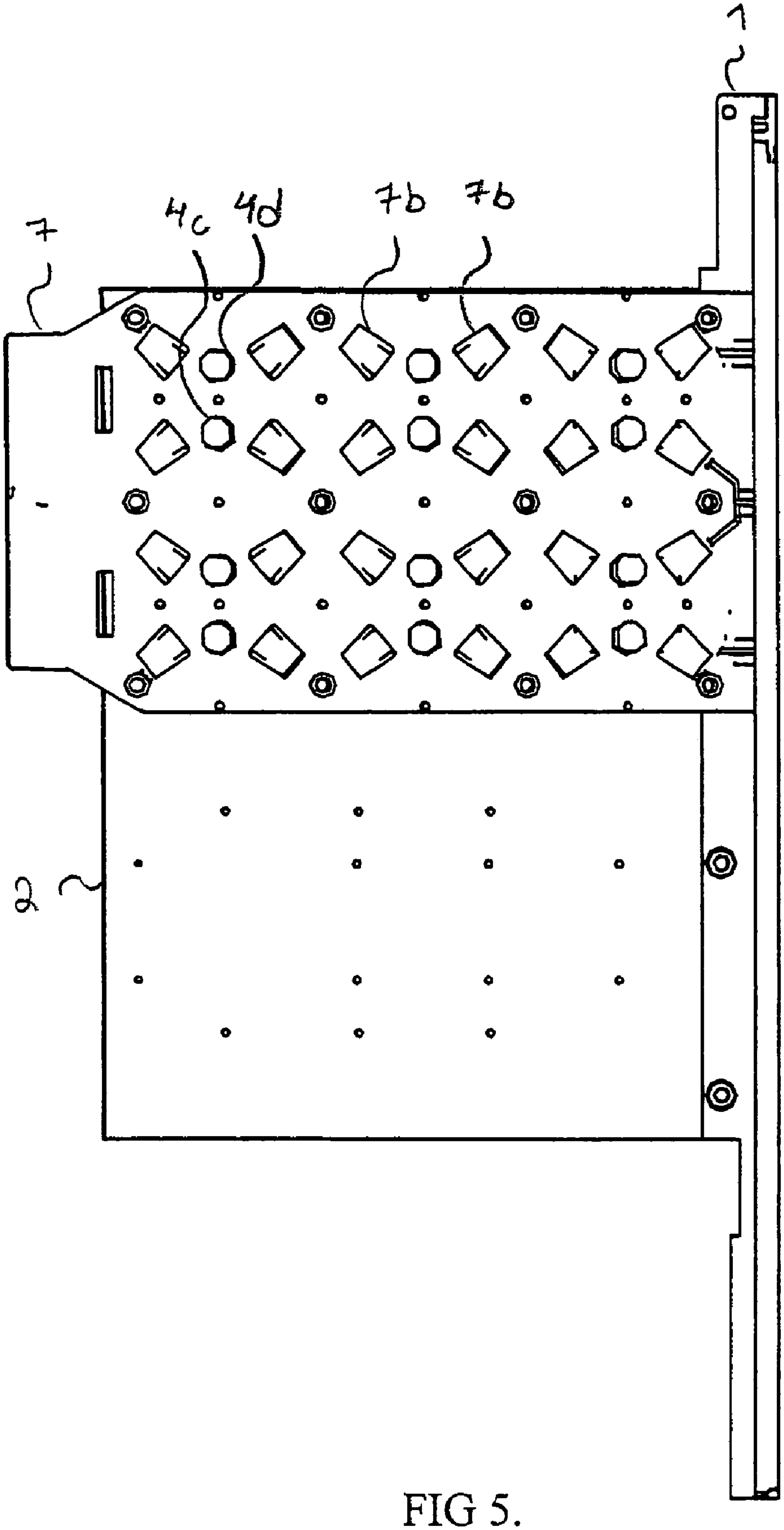
FIG. 5 shows a side view of the capacitor fixing and protecting arrangement of FIG. 2 when assembled.

FIGS. 2, 4 and 5 show an embodiment in which six capacitors can be fixed with one fixing plate 7. The fixing plate is positioned in connection with the upper surface 4*b* of the capacitors and fixed to the cooling element 2 with fixing members 7*a*. The fixing members may comprise, for example, a tubular portion 7*a*, through which the fixing plate can be fixed to the fixing element with screw-like means (not shown), for instance. The fixing plate has openings 4*c* and 4*d* of the type shown in FIG. 5 for capacitor switching. The fixing plate must direct forces at the capacitors 4 at least in the direction perpendicular to the longitudinal direction of the capacitors. The fixing plate has means 7*b* shown in FIG. 5 may function as fixing means that direct forces at the capacitors 4. The fixing means 7*b* are arranged to have flexibility with an adapted moment of force when attaching the fixing plate over the capacitors. This flexibility of the fixing means 7*b* reduces the risk of overtightening the fixing plate to the capacitor, which overtightening might damage the capacitors. This flexibility of the fixing means 7*b* also reduces the problem caused by the size variation of the capacitors 4, allowing thus all capacitors 4 to be tightened simultaneously. The fixing means 7*b* may, for instance, protrude from the fixing plate 7 in such a way that the fixing means 7*b* also direct forces at the side surfaces of the capacitors.

The adapter collar 5 is manufactured of electrically insulating material, such as plastic or corresponding material. However, the collar must have sufficient rigidity in order to support the capacitors sufficiently.

Between the capacitor and the cooling element, an electrically insulating film having good thermal conductivity, such as a Mylar® polyester film or an insulating film with corresponding properties (not shown), can be placed between the capacitor and the cooling element. If needed, heat-conducting paste may also be used.

The insulating film must be cut to a size of the diameter of the recess 3 or the inner diameter of the adapter collar 5. By using an insulating film in the embodiment of FIGS. 2 and 3, the drift distance between the capacitor and the cooling element can be made sufficiently long. The drift distance may be further increased by reducing the inner periphery diameter of the lower portion 5*a* of the adapter collar, in which case the length of the drift distance relative to the lower surface 4*a* of the capacitor and the cooling element increases.

It is to be understood that the above description and the related figures are only intended to illustrate the present invention. The invention is thus not confined to the above or to the embodiment defined in the claims, but a plurality of variations and modifications feasible within the inventive idea defined by the attached claims will be obvious to a person skilled in the art.

What is claimed is:

1. A fixing and protecting arrangement for a capacitor, comprising:

- a capacitor, the capacitor including a lower surface, an upper surface and a longitudinal axis;
- a cooling element;
- a fixing member configured to fix the capacitor to the cooling element; and
- at least one recess arranged in the cooling element, into which recess the capacitor is configured to be arranged in such a way that the lower surface of the capacitor is in contact with the cooling element to transfer heat from the capacitor to the cooling element;
- wherein the fixing member comprises a fixing plate arranged against the upper surface of the capacitor, the fixing plate being configured to direct forces at the capacitor in a direction of the longitudinal axis of the capacitor.

2. A fixing and protecting arrangement for a capacitor according to claim 1, wherein an adapter collar is arranged between the capacitor and the cooling element.

3. A fixing and protecting arrangement for a capacitor according to claim 2, wherein the recess includes:

a deeper portion closer to an outer periphery thereof, to which a lower portion of the adapter collar is mountable, and an inner portion, to which the lower surface of the capacitor is mountable.

4. A fixing and protecting arrangement for a capacitor according to claim 2, wherein the upper portion of the adapter collar is arranged to protrude to support the capacitor in a direction perpendicular to the longitudinal axis of the capacitor.

5. A fixing and protecting arrangement for a capacitor according to claim 1, wherein the fixing plate comprises fixing members configured to fix the fixing plate to the cooling element.

6. A fixing and protecting arrangement for a capacitor according to claim 1, wherein the fixing plate includes openings through which the capacitor is connectable.

7. A fixing and protecting arrangement for a capacitor according to claim 1, wherein the fixing plate includes at least one fixing member configured to direct forces at the capacitor in a direction perpendicular to the longitudinal axis of the capacitor.

8. A fixing and protecting arrangement for a capacitor according to claim 1, wherein an insulating film is arranged between the capacitor and the cooling element.

9. A fixing and protecting arrangement according to claim 1, wherein heat-conducting paste is arranged between the capacitor and the cooling element.

10. A fixing and protecting arrangement for a capacitor according to claim 1, wherein the fixing plate comprises fixing means which are arranged to have flexibility with an adapted moment of force when attaching the fixing plate over the capacitor thereby reducing the risk of over tightening when fixing the fixing plate.

* * * * *